US010641184B2

(12) United States Patent
Wulff et al.

(10) Patent No.: US 10,641,184 B2
(45) Date of Patent: May 5, 2020

(54) DYNAMIC FLIGHT COMMAND CROSS-FEED FOR ROTOR SPEED DROOP REDUCTION

(71) Applicant: Sikorsky Aircraft Corporation, Stratford, CT (US)

(72) Inventors: Ole Wulff, Ansonia, CT (US); Derek Geiger, Wilton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 21 days.

(21) Appl. No.: 15/684,009

(22) Filed: Aug. 23, 2017

(65) Prior Publication Data

US 2018/0135535 A1   May 17, 2018

Related U.S. Application Data

(60) Provisional application No. 62/422,199, filed on Nov. 15, 2016.

(51) Int. Cl.
*F02C 9/28*      (2006.01)
*G05D 1/08*      (2006.01)

(52) U.S. Cl.
CPC ............ *F02C 9/28* (2013.01); *G05D 1/0858* (2013.01); *F05D 2220/329* (2013.01); *F05D 2270/024* (2013.01); *F05D 2270/07* (2013.01)

(58) Field of Classification Search
CPC .. F02C 9/28; F05D 2270/024; F05D 2270/07; F05D 2220/329; G05D 1/0858
See application file for complete search history.

(56) References Cited

U.S. PATENT DOCUMENTS

| 5,265,826 | A  | * | 11/1993 | Ebert  | G05D 1/0858 |
| | | | | | 244/17.13 |
| 6,422,023 | B1 | * | 7/2002 | Dudd, Jr. | F02C 7/26 |
| | | | | | 60/773 |
| 6,879,885 | B2 | * | 4/2005 | Driscoll | B64C 27/12 |
| | | | | | 416/27 |
| 6,986,641 | B1 |   | 1/2006 | Desai et al. | |
| 8,170,728 | B2 |   | 5/2012 | Roesch | |
| 2016/0107759 | A1 | | 4/2016 | Vallart et al. | |
| 2016/0208717 | A1 | | 7/2016 | Cai | |

FOREIGN PATENT DOCUMENTS

| CA | 2817487 A1 | * | 12/2013 | |
| DE | 19542046 A1 | * | 5/1996 | ............ B60W 10/06 |
| EP | 1310645 A2 | | 5/2003 | |
| WO | 2016054014 A1 | | 4/2016 | |

* cited by examiner

*Primary Examiner* — Rodney A Butler

(74) *Attorney, Agent, or Firm* — Cantor Colburn LLP

(57) ABSTRACT

An aircraft and method of flying an aircraft are disclosed. The aircraft includes a cross-feed unit that receives a flight command for the aircraft and determines an amount of fuel for a motor of the aircraft in order to reduce a droop in the aircraft when executing the flight command at the aircraft. A fuel injector or fuel supplier provides the determined amount of fuel to the motor when the flight command is executed at the aircraft.

14 Claims, 4 Drawing Sheets

# DYNAMIC FLIGHT COMMAND CROSS-FEED FOR ROTOR SPEED DROOP REDUCTION

CROSS REFERENCE TO RELATED APPLICATIONS

The present invention claims priority to U.S. Provisional Application Ser. No. 62/422,199, filed Nov. 15, 2016, the contents of which are incorporated herein by reference in their entirety.

STATEMENT OF FEDERAL SUPPORT

This invention was made with government support with the United States Army under Contract No.: W911W6-14-2-0005. The government therefore has certain rights in this invention.

BACKGROUND OF THE INVENTION

The present invention is directed to a system and method for reducing rotor speed droop in an aircraft and, in particular, to determining a fuel or electric power amount needed at an aircraft engine or electric motor to execute autonomous guidance system's and pilot's command at the aircraft to reduce rotor speed droop normally associated with the autonomous guidance system's and pilot's command.

Different maneuvers at a rotary-wing aircraft place different power requirements on an engine of the aircraft. When the aircraft performs a maneuver that leads to small changes in the state of the aircraft, an engine control system of the aircraft is able to regulate the engine speed in order to prevent or reduce rotor speed droop (Nr). However, aggressive and/or transient aircraft maneuvers can impose a sudden power burden at the engine or electric motor, leading to significant rotor speed droop. Accordingly, there is a need to provide a system that prevents or reduces rotor speed droop for aggressive and/or transient aircraft maneuvers.

SUMMARY OF THE INVENTION

According to one embodiment of the present invention, a method of flying an aircraft includes: receiving a control input at the aircraft; determining a flight command indicated by the control input; determining an amount of fuel required at the motor of the aircraft in order to reduce a rotor droop when executing the flight command at the aircraft; and providing the determined amount of fuel to the motor of the aircraft to execute the flight command.

According to one embodiment of the present invention, an aircraft includes a cross-feed unit that receives a flight command for the aircraft and determines an amount of fuel for a motor of the aircraft to reduce rotor speed droop when executing the flight command at the aircraft; and a fuel supplier that provides the determined amount of fuel to the motor of the aircraft when the flight command is executed at the aircraft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
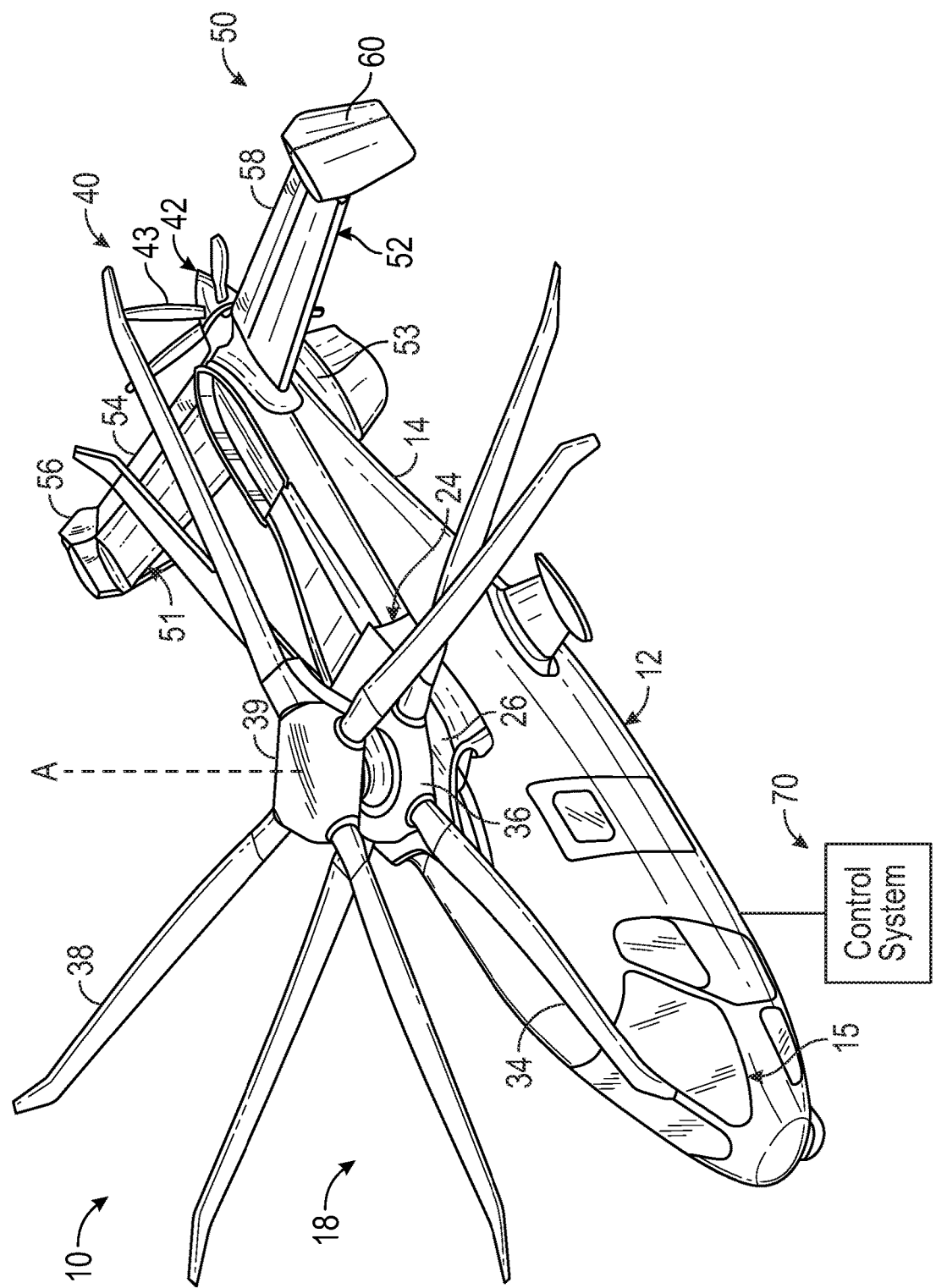
FIG. 1 depicts an exemplary embodiment of a coaxial rotary wing, vertical takeoff and land (VTOL) aircraft.

Referring now to the Figures, where the invention will be described with reference to specific embodiments, without limiting same, FIG. 1 depicts an exemplary embodiment of a coaxial rotary wing, vertical takeoff and land (VTOL) aircraft 10 suitable for employing the rotor speed droop reduction system disclosed herein. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes a cockpit 15 having two seats for flight crew (e.g., pilot and co-pilot) and six seats for passengers (not shown). Main rotor assembly 18 is driven by a power source, for example, one or more motors 24 via a gearbox 26. In various embodiments, a motor can include an electric motor, a piston engine, a gas turbine or other device for providing motion. Main rotor assembly 18 includes an upper rotor assembly driven in a first direction (e.g., counter-clockwise) about the main rotor axis, A, and a lower rotor assembly driven in a second direction (e.g., clockwise) about the main rotor axis, A, opposite to the first direction (i.e., counter rotating rotors). Upper rotor assembly includes a first plurality of rotor blades 38 supported by a first rotor hub 39. Lower rotor assembly includes a second plurality of rotor blades 34 supported by a second rotor hub 36. The first plurality of rotor blades 38 rotate through a first rotor disk and the second plurality of rotor blades 34 rotate through a second rotor disk. In some embodiments, the aircraft 10 further includes a translational thrust system 40 having a propeller 42 located at the extending tail 14 to provide translational thrust (forward or rearward) for aircraft 10. Propeller 42 includes a plurality of propeller blades 43.

Propeller 42, or translational thrust system 40, is connected to, and driven by, the motor 24 via the gearbox 26. Translational thrust system 40 may be mounted to the rear of the airframe 12 to provide thrust for high-speed flight. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable flight surfaces, e.g., surfaces that alter a flight path/characteristics of aircraft 10.

Aircraft 10 includes a control system 70 for controlling flight of the aircraft 10 and for controlling the motor 24 of the aircraft to reduce rotor speed droop. The control system 70 includes a processor (not shown) that executes a flight control system such as discussed below with respect to FIGS. 3-5, in one embodiment. Aircraft 10 includes control axes that define rotation of the aircraft with respect to the body of the aircraft. Control of the aircraft around a control axis provides a motion of the aircraft that changes a flight state of the aircraft. For example, control of the aircraft around longitudinal control axis provides a roll of the aircraft. Similar axes define pitch and yaw angles and angular rates. Although the motor 24 is described being a motor that provides torque to the main rotor assembly, in other embodiments, the motor may include an electric motor that provides torque to the main rotor assembly.

Figure 2:
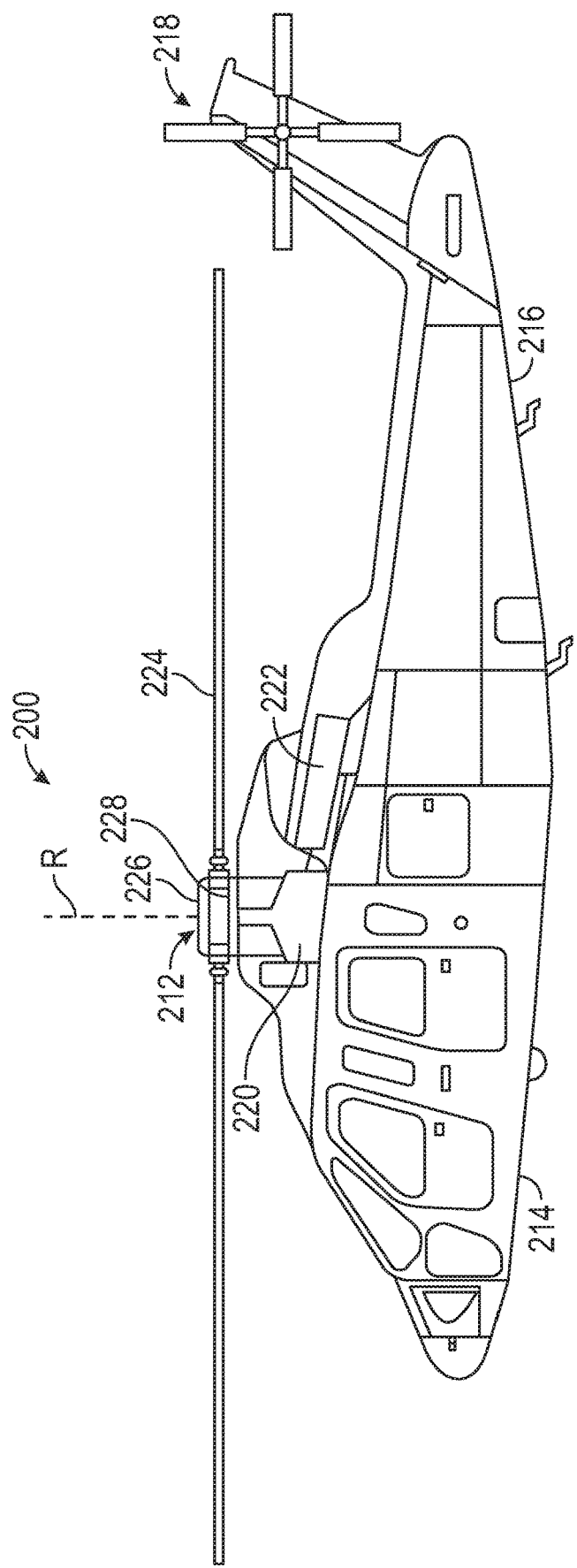
FIG. 2 schematically illustrates a conventional rotary wing aircraft having a main rotor assembly.

FIG. 2 schematically illustrates a conventional rotary wing aircraft 200 having a main rotor assembly 212, the aircraft 200 being suitable for employing the rotor speed droop reduction system disclosed herein. The aircraft 200 includes an airframe 214 having an extending tail 216 which mounts a tail rotor assembly 218, such as an anti-torque system. The main rotor assembly 212 is driven about an axis of rotation R through a gearbox (illustrated schematically at 220) by one or more motors 222. The main rotor assembly 212 includes multiple rotor blades 224 mounted to a rotor hub 226, and a swashplate 228 that is used to affect a state or orientation of the rotor blades 224. The rotor blades 224 can have a variable pitch that can be used to affect pitch and roll angles of the aircraft 200 as well as velocity of the aircraft 200. The pitch of the rotor blades 224 can be controlled by a collective control or by a cyclic control. The aircraft 200 may include a control system (similar to control system 70 of FIG. 1) for flying the aircraft 200 to reduce rotor speed droop according to the methods disclosed herein. As with aircraft 10 in FIG. 1, aircraft 200 has control axes for controlling a flight state of the aircraft 200. Although particular helicopter configurations are illustrated herein in FIGS. 1 and 2 and described in the disclosed embodiment, other configurations and/or machines, such as high speed compound rotary wing aircraft with supplemental translational thrust systems, dual contra-rotating aircraft, turbo-props, tilt-rotors and tilt-wing aircraft, will also benefit from embodiments of the invention.

Figure 3:
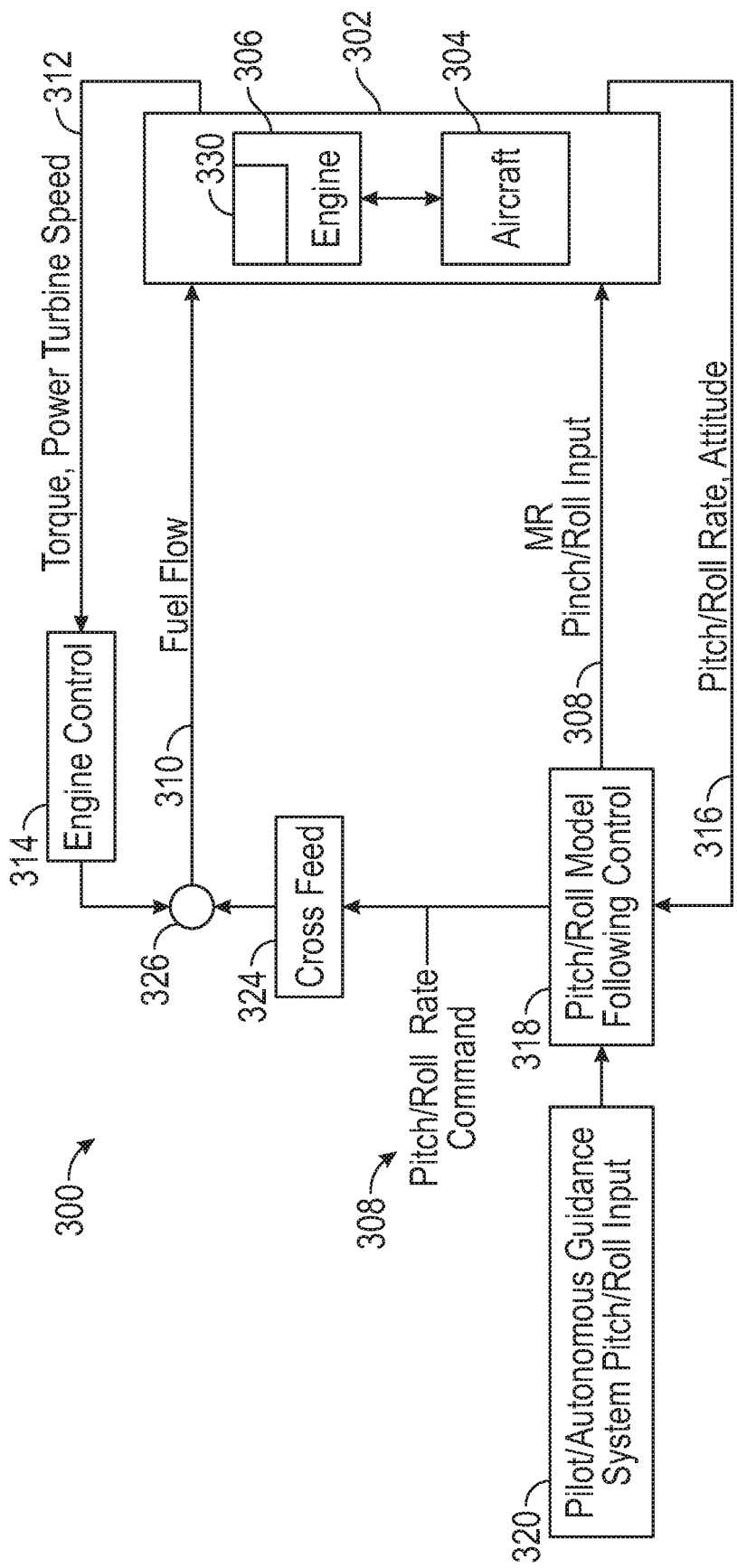
FIG. 3 shows a schematic diagram of a system for preventing or reducing rotor speed droop during a pitch or a roll of the aircraft, in one embodiment.
Figure 4:
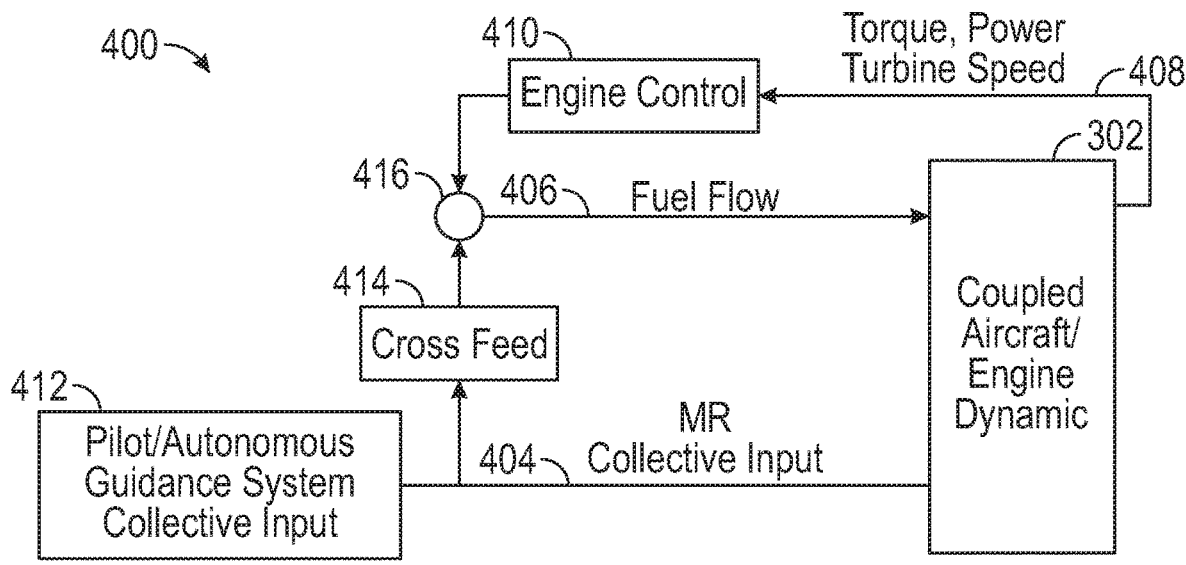
FIG. 4 shows a schematic diagram of a system for preventing or reducing rotor speed droop in response to a pilot or autonomous guidance system collective command, in one embodiment.
Figure 5:
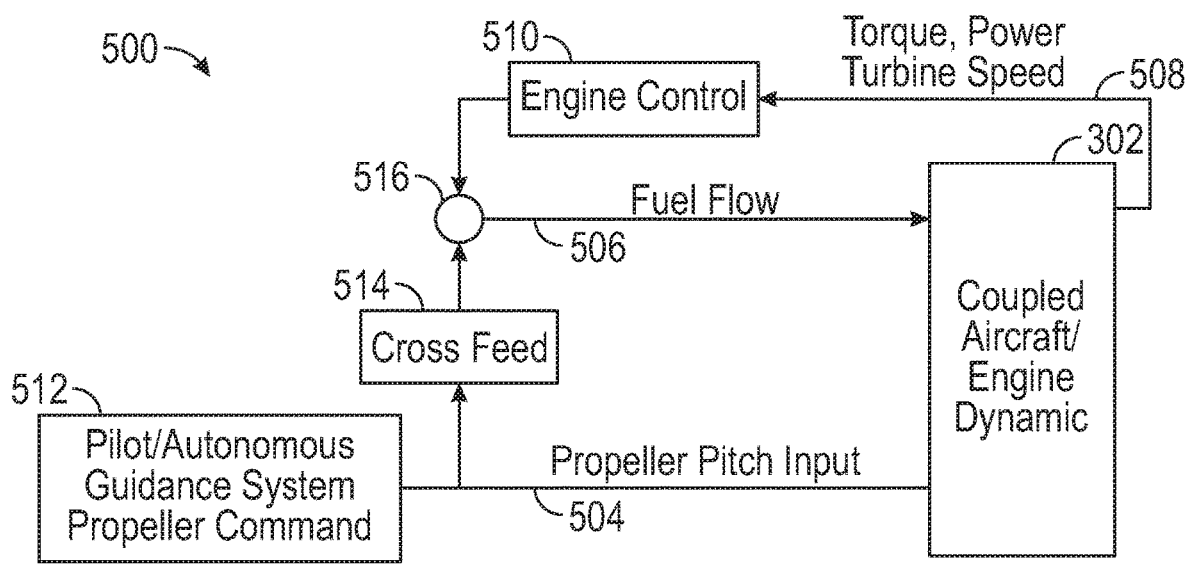
FIG. 5 shows a schematic diagram of a system for preventing or reducing a rotor speed droop due to a pilot or autonomous guidance system propeller command, in one embodiment.

FIGS. 3-5 show schematic diagrams of various systems for preventing or reducing rotor speed droop for different aircraft maneuvers, such as pitch/roll axis maneuvers (FIG. 3), collective input maneuvers (FIG. 4) and propeller pitch maneuvers (FIG. 5). The schematic diagrams show Cross-Feed units (324, 414, 514) designed to determine a fuel amount required to prevent or reduce rotor speed droop for their respective aircraft maneuvers. While, shown as three separate Cross-Feed units (324, 414, 514), the operations they perform can be performed by a single Cross-Feed unit that receives the various inputs shown in the diagrams and performs computations on the received inputs.

FIG. 3 shows a schematic diagram of a system 300 for preventing or reducing rotor speed droop during a pitch or a roll of the aircraft, in one embodiment. The aircraft 304 and the motor 306 of the aircraft 304 are shown as part of a coupled aircraft/motor dynamic system 302. The motor 306 provides a torque to a rotor blade system of the aircraft 304 to fly the aircraft 304. The aircraft 304 receives flight commands 308 (i.e., MR Pitch/Roll Input) and the motor 306 receives a total fuel flow 310. The total fuel flow 310 is determined so as to provide enough power at aircraft 304 to execute flight command 308 while reducing rotor speed droop normally associated with the flight command (i.e., with pitch and/or roll of the aircraft 304). In one embodiment, the total fuel flow 310 is provided to the motor 306 simultaneous with the flight commands 308 being executed at the aircraft 304. Alternatively, the total fuel flow 310 is provided to the motor 306 immediately prior to the flight commands 308 being executed at the aircraft 304. The total fuel flow 310 is nonetheless provided to the motor 306 on an as-needed basis in order to prevent or reduce rotor speed droop when executing the flight commands 308 at the aircraft 304.

Motor sensors measure motor parameters 312 (e.g., torque, power turbine speed, etc.) and provide these parameters to a Motor Controller 314. The Motor Controller 314 determines an amount of fuel to be provided to the motor based on the state of the motor indicated by the motor parameters 312. The fuel flow determined at the Motor Controller 314 runs the motor 306 at an operating point that maintains a flight state of the aircraft 304.

Sensors at the aircraft 304 provide signals indicating current flight parameters 316, such as current pitch/roll rate of the aircraft 304, attitude of the aircraft 304, etc., to a Pitch/Roll Model Following Control 318. The Pitch/Roll Model Following Control 318 determines the flight commands 308 from the pilot's or autonomous guidance system's commands 320 and the current flight parameters 316. The Pitch/Roll Model Following Control 318 provides the flight commands 308 (i.e., Pitch/Roll Rate Command) to the aircraft 304 as well as to a Cross-Feed unit 324.

The Cross-Feed unit 324 determines a fuel flow, or an amount of fuel, that is needed at motor 306 in order to prevent or reduce the occurrence of rotor speed droop when the flight commands 308 are executed at the aircraft 304. The Cross-Feed unit 324 operates a model of the coupled aircraft/motor dynamic system 302 in order to determine fuel needs at the aircraft 304 for a selected flight command 308. The aircraft-motor model computes a motor torque requirement for the selected flight commands 308 using various flight parameters of the aircraft including, but not limited to, aircraft air speed, air density, altitude of the aircraft, etc. The range of the flight parameters may define a flight envelope of the aircraft 304. The aircraft/motor dynamic model thus is valid over various flight conditions, such as hovering, high speed flight, flying at sea level, flying at high altitudes, etc.

The model of the Cross-Feed unit 324 determines the torque response at the motor 306 for the flight commands 308 and then determines a fuel flow that will provide the torque response necessary for reducing rotor speed droop when the flight commands 308 are executed at the aircraft 304. The fuel flow determined by the Cross-Feed unit 324 is added to the fuel flow determined by the Motor Controller 314 at adder 326 in order to provide a total fuel flow to motor 306. The adder 326 may be coupled to a fuel supplier 330 of the motor 306 that provides the total fuel flow indicated by the adder 326 to the motor 306 of the aircraft 304.

FIG. 4 shows a schematic diagram of a system 400 for preventing or reducing rotor speed droop in response to a pilot or autonomous guidance system collective command, in one embodiment. Coupled aircraft/motor dynamic system 302 includes the aircraft 304 and the motor 306, as shown in FIG. 3. The aircraft 304 receives collective flight commands 404 (i.e., MR Collective Input) and the motor 306 receives a total fuel flow 406 and uses the total fuel flow 406 to provide enough power to motor 306 to reduce rotor speed droop while executing the collective flight command 404 at the aircraft 304.

Motor sensors measure motor parameters 408 (e.g., torque, power turbine speed, etc.) and provide these parameters to a Motor Controller 410. The Motor Controller 410 determines an amount of fuel to be provided to the motor based on the state of the motor indicated by the motor parameters 408. The fuel flow determined at the Motor Controller 410 runs the motor 306 at an operating point that maintains a flight state of the aircraft 304.

An input of the autonomous guidance system or movement of the pilot collective stick 412 provides a collective flight command 404 to the aircraft 304 and to Cross-Feed unit 414. The Cross-Feed unit 414 determines a fuel flow that is needed in order to execute the collective flight command 404 at the aircraft 304 without an occurrence of a rotor speed droop normally associated with the collective flight command 404.

Similar to the Cross-Feed unit 324 of FIG. 3, the Cross-Feed unit 414 operates a model of the coupled aircraft/motor dynamic system 302 that includes various flight parameters, such as aircraft air speed, air density, altitude of the aircraft, etc. The model being run at the Cross-Feed unit 414 determines a torque response to the collective flight commands 404 and determines a fuel flow that will provide the torque response necessary at the motor 306 to reduce a rotor speed droop when the collective flight commands 404 are executed at the aircraft 304.

The fuel flow determined by the Cross-Feed unit 414 is added to the fuel flow determined by the Motor Controller 410 at adder 416 in order to provide a total fuel flow to the aircraft 304. The adder 416 may be coupled to a fuel supplier that provides the total fuel flow indicated by the adder 416 to the motor 306 of the aircraft 304.

FIG. 5 shows a schematic diagram of a system 500 for preventing or reducing a rotor speed droop due to a pilot or autonomous guidance system propeller command, in one embodiment. Coupled aircraft/motor dynamic system 302 includes the aircraft 304 and the motor 306 of the aircraft 304, as shown in FIG. 3. The aircraft 304 receives flight commands 504 (i.e., Propeller Pitch Input) and a total fuel flow 506 and uses the total fuel flow 506 in order to provide enough power to motor 306 to reduce rotor speed droop while executing the propeller pitch flight command 504 at the aircraft 304.

Motor sensors measure motor parameters 508 (e.g., torque, power turbine speed, etc.) and provide these parameters to a Motor Controller 510. The Motor Controller 510 determines an amount of fuel to be provided to the motor based on the state of the motor indicated by the motor parameters 508. The fuel flow determined at the Motor Controller 510 runs the motor at a motor operating point to maintain a flight state of the aircraft 502 (such as an airspeed).

An autonomous guidance system or pilot propeller command 512 provides the flight command 504 to the aircraft 304 and to Cross-Feed unit 514. The Cross-Feed unit 514 determines a fuel flow that is needed in order to execute the propeller flight command 504 to accelerate the aircraft 304 without an occurrence of a rotor speed droop normally associated with such acceleration.

Similar to the Cross-Feed unit 324 of FIG. 3, the Cross-Feed unit 514 operates a model of the coupled aircraft/motor dynamic system 302 that includes various flight parameters of such as aircraft air speed, air density, altitude of the aircraft, etc., and defines the parameter for a flight envelope of the aircraft. The model of the Cross-Feed unit 514 determines a torque response to the propeller pitch flight commands 504 and determines a fuel flow that will provide the necessary torque response at the motor 306 to reducing rotor speed droop.

The fuel flow determined by the Cross-Feed unit 514 is added to the fuel flow determined by the Motor Controller 510 at adder 516 in order to provide a total fuel flow 506 to the aircraft 502. The adder 516 may be coupled to a fuel supplier that provides the total fuel flow indicated by the adder 516 to the motor 306 of the aircraft 304.

As discussed above, the aircraft systems of FIGS. 3-5 the motor of the aircraft systems is an engine that powers the aircraft and the term "fuel" refers to a combustible material used in the engine. In alternate embodiments, the motor of the aircraft systems can be an electrical motor. In such embodiments, the term "fuel" can be understood to refer to an electrical current and/or voltage and determinations, calculations, communication and other actions with respect to a fuel signal can be understood to refer to comparable determinations, calculations and/or communications and other actions with respect to an electrical demand signal indicative of demand for electrical current or voltage. Similarly, the "fuel supplier" can be understood to be a supplier of electricity, such as a battery. While the system 300 of FIG. 3 and system 400 of FIG. 4 may be applicable to most types of rotary-wing aircraft, the system 500 may be used with those rotary-wing aircraft having a rear propeller, such as the coaxial rotary wing VTOL aircraft shown in FIG. 1.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A method of flying an aircraft, comprising:
receiving a control input at a control system of the aircraft;
determining a flight command indicated by the control input;
computing a torque response at a motor of the aircraft to the flight command for a selected air density and altitude of the aircraft;
determining an amount of fuel required at the motor in order to reduce a rotor droop associated with the torque response when executing the flight command at the aircraft;

determining a fuel flow to the motor based on motor parameters, executing the determined flight command at the aircraft; and supplying fuel to the motor of the aircraft to reduce the rotor droop while executing the flight command, wherein the fuel supplied to the motor is a sum of the fuel flow determined by the engine controller and the amount of fuel for reducing rotor speed droop determined by the processor.

2. The method of claim 1, further comprising determining the amount of fuel based on a dynamic interaction between the aircraft and the motor of the aircraft.

3. The method of claim 2, wherein the control system includes a pitch/roll model following control system, further comprising receiving a pitch/roll command and a current pitch/roll state at the pitch/roll model following control system and determining the flight command as a pitch/roll command based on the pitch/roll command and current pitch/roll state.

4. The method of claim 3, wherein the flight parameter includes at least one of: (i) aircraft air speed; (ii) air density; (iii) aircraft altitude; (iv) air temperature; (v) rotor speed.

5. The method of claim 2, further comprising determining, using the dynamic interaction between the aircraft and the motor, the torque response of the motor for executing the flight command and determining the amount of fuel from the determined the torque response.

6. The method of claim 1, wherein the control input includes at least one of (i) a pitch command; (ii) a roll command; (iii) a collective command; and (iv) a propeller pitch command.

7. The method of claim 1, wherein the amount of fuel required at the motor to reduce a rotor droop is added to a fuel requirement determined from a motor controller to obtain a total fuel flow and the total fuel flow is provided to the motor of the aircraft.

8. The method of claim 1, wherein the motor includes at least one of: (i) an engine; and (ii) an electrical motor.

9. An aircraft, comprising:
a control system that provides a flight command to the aircraft for execution of the flight command in response to a command input;
a processor of the control system that computes a torque response at a motor of the aircraft to the flight command for a selected air density and altitude of the aircraft and determines an amount of fuel for the motor for reducing rotor speed droop associated with the torque response when executing the flight command at the aircraft;
an engine controller that determines a fuel flow to the motor based on motor parameters; and
a fuel supplier that provides the determined amount of fuel to the motor when the flight command is executed at the aircraft, wherein the determined amount is a sum of the fuel flow determined by the engine controller and the amount of fuel for reducing rotor speed droop determined by the processor.

10. The aircraft of claim 9, wherein the processor determines the amount of fuel based on a dynamic interaction between the aircraft and the motor of the aircraft.

11. The aircraft of claim 10, wherein the control system includes a pitch/roll model following control system that receives a pitch/roll command and a current pitch/roll state and determines the flight command as a pitch/roll command based on the pitch/roll command and current pitch/roll state.

12. The aircraft of claim 10, wherein the processor determines a torque response required to execute the flight command and determines the amount of fuel from the determined the torque response.

13. The aircraft of claim 9, wherein the flight command is at least one of (i) a pitch command; (ii) a roll command; (iii) a collective command; and (iv) a propeller pitch command.

14. The aircraft of claim 13, further comprising an engine controller for determining a fuel requirement for maintaining a flight state of the aircraft, wherein the fuel supplier provides a total fuel flow to the aircraft that is a sum of the fuel requirement determined by the engine controller and the amount of fuel for reducing the rotor speed droop.

* * * * *